United States Patent
Pendergraft et al.

(10) Patent No.: US 9,993,956 B2
(45) Date of Patent: Jun. 12, 2018

(54) APPARATUS FOR THERMALLY INSULATING A CYLINDRICAL BARREL AND MONITORING THE TEMPERATURE THEREOF

(71) Applicants: Jason Pendergraft, Tulsa, OK (US); John Pendergraft, Tulsa, OK (US)

(72) Inventors: Jason Pendergraft, Tulsa, OK (US); John Pendergraft, Tulsa, OK (US)

( * ) Notice: Subject to any disclaimer, the term of this patent is extended or adjusted under 35 U.S.C. 154(b) by 82 days.

(21) Appl. No.: 14/662,930

(22) Filed: Mar. 19, 2015

(65) Prior Publication Data

US 2016/0193772 A1    Jul. 7, 2016

Related U.S. Application Data

(63) Continuation-in-part of application No. 14/590,420, filed on Jan. 6, 2015.

(51) Int. Cl.
| | |
|---|---|
| *B29C 47/66* | (2006.01) |
| *B29C 47/82* | (2006.01) |
| *G01K 1/14* | (2006.01) |
| B29C 47/00 | (2006.01) |
| F16L 59/02 | (2006.01) |

(52) U.S. Cl.
CPC ............ *B29C 47/66* (2013.01); *B29C 47/82* (2013.01); *G01K 1/143* (2013.01); *B29C 47/0023* (2013.01); *F16L 59/026* (2013.01)

(58) Field of Classification Search
CPC ......... A47J 31/053; A47J 27/62; A47J 27/004
USPC ....... 165/11.1; 219/441, 387, 435, 442, 528, 219/489, 492, 322
See application file for complete search history.

(56) References Cited

U.S. PATENT DOCUMENTS

| | | | | |
|---|---|---|---|---|
| 3,751,014 A | * | 8/1973 | Waterloo | B29C 47/82 |
| | | | | 165/289 |
| 4,763,638 A | * | 8/1988 | Hurley | F24C 14/025 |
| | | | | 126/21 A |
| 5,974,227 A | | 10/1999 | Schave | |
| 6,384,385 B1 | * | 5/2002 | Puleo | H01L 23/34 |
| | | | | 219/209 |
| 6,486,445 B1 | | 11/2002 | Pendergraft | |
| 6,903,308 B2 | | 6/2005 | Pendergraft | |
| 7,196,293 B2 | * | 3/2007 | Britto | H01R 13/7038 |
| | | | | 219/387 |
| 7,914,277 B1 | | 3/2011 | Burrows et al. | |

(Continued)

FOREIGN PATENT DOCUMENTS

| | | |
|---|---|---|
| JP | 3709988 | 10/2005 |
| JP | 2014034125 | 2/2014 |
| WO | WO2008002022 | 1/2008 |

OTHER PUBLICATIONS

International Search Report and Written Opinion from Corresponding PCT Patent Application PCT/US2015/055851; dated Jan. 25, 2016; Korean Intellectual Property Office.

*Primary Examiner* — Dana Ross
*Assistant Examiner* — Kuangyue Chen
(74) *Attorney, Agent, or Firm* — Head, Johnson, Kachigian & Wilkinson, PC

(57) ABSTRACT

An apparatus for thermally insulating a cylindrical barrel and monitoring the temperature thereof. The apparatus includes a plurality of flexible covers, each flexible cover circumnavigating the cylindrical barrel. Each of the plurality of flexible covers includes a temperature sensing element thereon.

9 Claims, 2 Drawing Sheets

(56) References Cited

U.S. PATENT DOCUMENTS

| | | | |
|---|---|---|---|
| 2004/0074891 A1* | 4/2004 | Pendergraft | B29C 45/74 219/424 |
| 2007/0222125 A1 | 9/2007 | Grajewski | |
| 2008/0197097 A1* | 8/2008 | Montgomery | A61J 9/001 215/11.2 |
| 2009/0056856 A1 | 3/2009 | Taylor et al. | |
| 2011/0221088 A1 | 9/2011 | Fuse | |
| 2012/0193347 A1* | 8/2012 | Schwartz | F24J 1/00 219/482 |
| 2013/0019374 A1* | 1/2013 | Schwartz | A61F 5/00 2/69 |

* cited by examiner

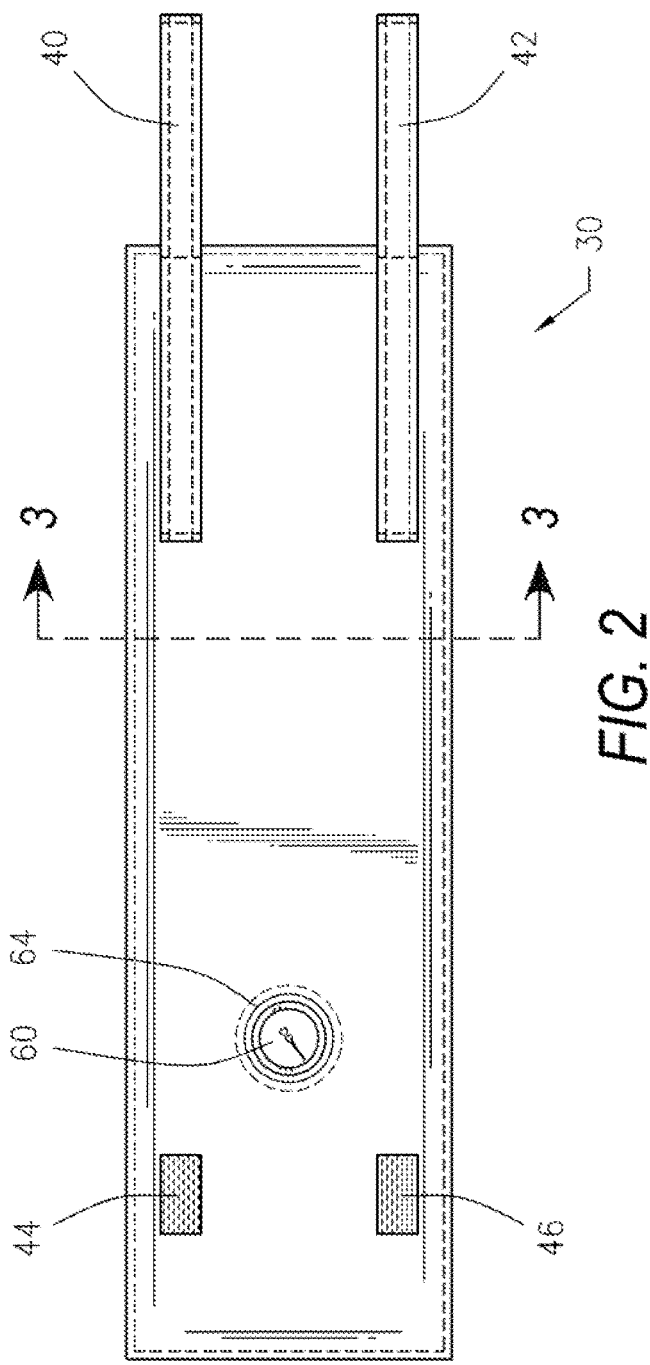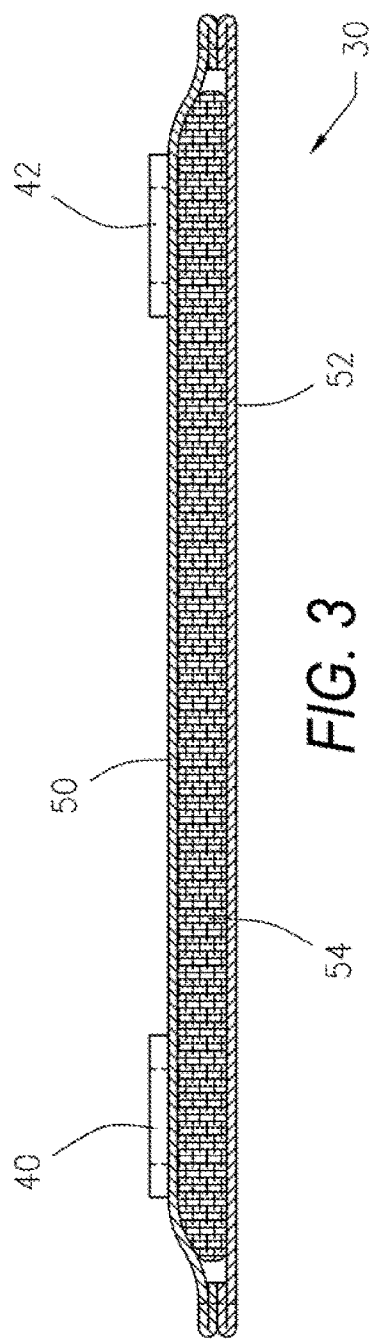

APPARATUS FOR THERMALLY INSULATING A CYLINDRICAL BARREL AND MONITORING THE TEMPERATURE THEREOF

CROSS REFERENCE TO RELATED APPLICATIONS

This application is a continuation-in-part application of U.S. patent application Ser. No. 14/590,420 filed Jan. 6, 2015 entitled "MODULAR HEATING AND COOLING ELEMENTS FOR CONTROLLING TEMPERATURE OF MATERIALS IN A FLOWABLE STATE," the contents of which are hereby incorporated by reference.

BACKGROUND OF THE INVENTION

1. Field of the Invention

The present invention relates to an apparatus for thermally insulating a cylindrical barrel and monitoring the temperature thereof.

2. Prior Art

It is known in the plastics and polymer industries to utilize injection and/or extrusion equipment to form or manufacture components and products. Plastic or polymer resins along with additives are subjected to hot temperatures in order to convert the plastic or polymer resins into a flowable material. The material is injected or forced under pressure through a barrel before directing into a mold cavity or die. The barrel may include a rotating screw which mixes the materials and moves them through the barrel. Thereafter, the molten plastic or resin leaves the barrel and enters the mold or die.

In order to insure optimum flow characteristics, the barrels are often equipped with heating or cooling mechanisms in order to control the temperature of the compound. Assignee's prior patent, U.S. Pat. No. 6,486,445, entitled "Vacuum Cast Ceramic Fiber Insulated Band Having Heating and Cooling Elements," illustrates an example of a ceramic fiber insulated band. The flow characteristics of the fluid material are dependent upon the ability to control the heat applied to the barrel as the fluid passes therethrough.

Assignee's prior pending patent application, U.S. patent application Ser. No. 14/590,420 filed Jan. 6, 2015 entitled "MODULAR HEATING AND COOLING ELEMENTS FOR CONTROLLING TEMPERATURE OF MATERIALS IN A FLOWABLE STATE," provides an example of an apparatus for controlling the temperature of materials in a flowable state as they flow through a barrel wherein individual temperature controlling mechanisms are both removable and replaceable.

It would be desirable to provide an apparatus for thermally insulating a cylindrical barrel in order to retain the heat characteristics inside the barrel and of the materials therein.

It would also be desirable to provide an apparatus for thermally insulating a cylindrical barrel to prevent accidental burn injury to personnel.

It would also be desirable to provide an apparatus for thermally insulating a cylindrical barrel which also is capable of monitoring the temperature of the outside of the barrel and indirectly monitoring the temperature of the material within the barrel.

It would also be desirable to provide an apparatus for thermally insulating a cylindrical barrel and monitoring the temperature thereof which incorporates alerts or alarms in the event that a temperature is outside of an acceptable range.

SUMMARY OF THE INVENTION

The present invention is directed to an apparatus for thermally insulating a cylindrical barrel and monitoring the temperature thereof.

The apparatus includes a plurality of flexible covers which, when in use, surround and encase a barrel. The covers are axially aligned with each other and also axially aligned with the barrel.

Each flexible cover has a length at least as long as the circumference of the barrel.

Each cover is removable and attachable to itself in order to hold the apparatus in place surrounding the barrel. Each cover includes a pair of attachment pads and a pair of attachment straps. The attachment pads and attachment straps each have hook and loop fasteners so that when the flexible cover is brought into place around the barrel, the flexible cover will be held in place.

In a preferred embodiment, each cover includes a pair of opposing external flexible sheets with insulation material therebetween.

Each cover includes a temperature sensing element thereon. The temperature on the outside of the cover is monitored, which also provides an indirect indication of the temperature of the materials in the barrel.

BRIEF DESCRIPTION OF THE DRAWINGS

FIG. 2 illustrates a top view of one of the covers of the apparatus apart from the barrel; and FIG. 3 illustrates a sectional view taken along section line 3-3 of FIG. 2.

DETAILED DESCRIPTION OF THE PREFERRED EMBODIMENTS

Figure 1:
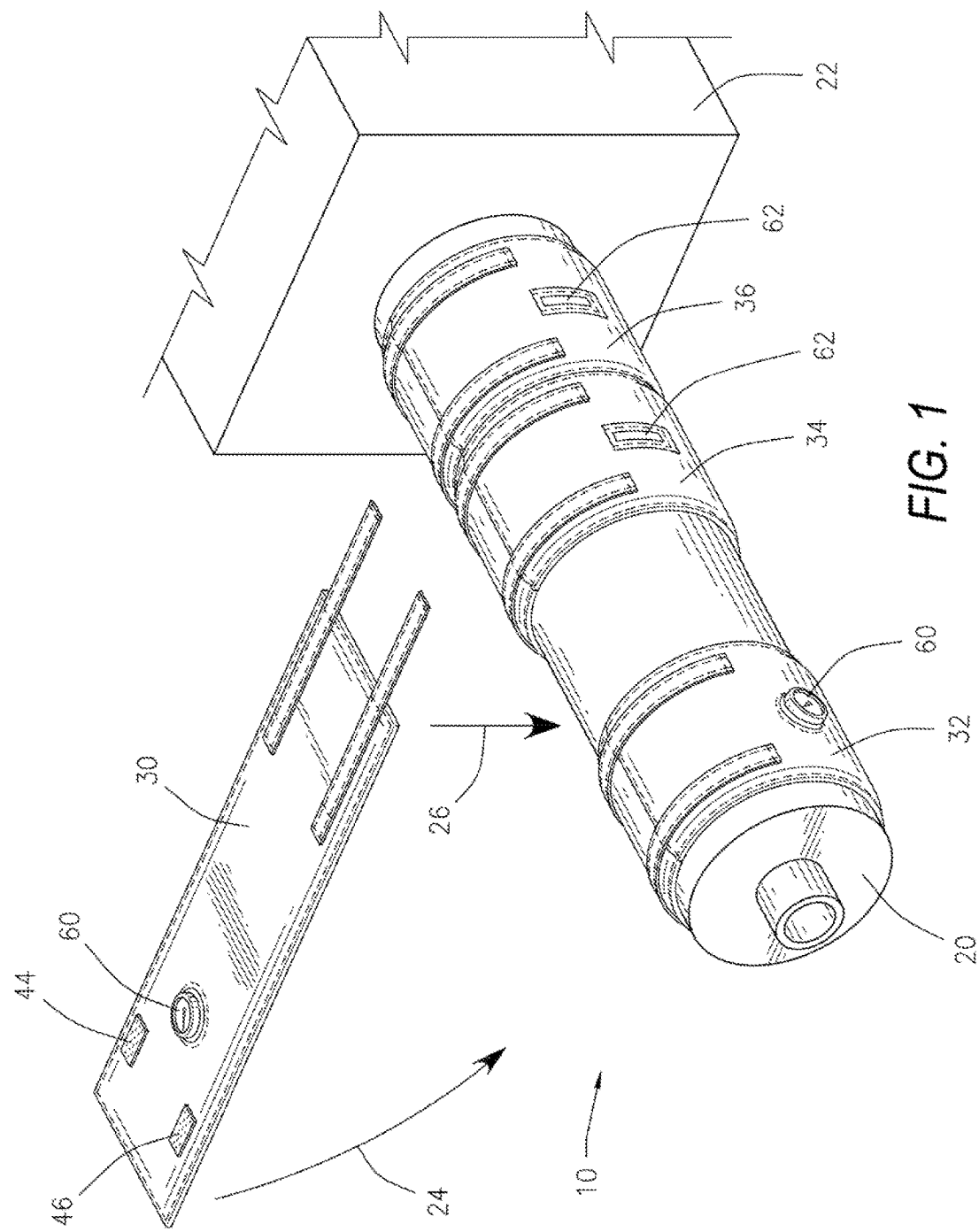
FIG. 1 illustrates a perspective view of an apparatus for thermally insulating a cylindrical barrel and monitoring the temperature thereof.

Referring to the drawings in detail, FIG. 1 illustrates a perspective view of an apparatus 10 for thermally insulating a cylindrical barrel and monitoring the temperature thereof. The apparatus 10 includes at least one flexible cover, to be described in detail. As shown in FIG. 1, a plurality of the flexible covers 30, 32, 34 and 36 are shown. A greater or lesser number of covers may be used within the spirit and scope of the invention. Each of the covers 30, 32, 34 and 36, when in use, surrounds and encases a barrel 20. The covers may surround a base heater barrel or may surround cylindrical heaters or coolers surrounding the barrel. One cover 30 is shown apart from the barrel 20.

The barrel 20 may include a rotating screw (not shown) to move materials therethrough. Various raw materials which are used for parts or components to be molded or manufactured may be mixed and prepared within a plastic injection and/or extrusion machine 22. In one non-limiting example, plastic beads are fed into the injection and/or extrusion machine 22 along with colorants or other additives.

During the injection and/or extrusion process, the ability to maintain control over the temperature of the materials is critically important. The materials pass from the injection and/or extrusion machine 22 through the barrel 20 and into a mold or die (not shown) at the opposed end of the barrel 20.

In the present embodiment, the barrel 20 is in the form of a cylinder although other embodiments, such as a square or oval cross section, are possible within the spirit or scope of the invention.

The covers 30, 32, 34 and 36, when installed around the circumference of the barrel 20, are axially aligned with each other and also axially aligned with the barrel 20. The arrows 24 and 26 illustrate the direction in order to move the cover 30 to install around the barrel 20.

Each cover is flexible and has a length at least as long as the circumference of the barrel. One cover 30 is shown in a top view in FIG. 2 apart from the barrel 20.

Each cover 30, 32, 34 and 36 is removable and attachable to itself in order to hold the apparatus in place surrounding the barrel 20.

As shown, each flexible cover 30, 32, 34 and 36 includes a pair of attachment pads 40 and 42 and a pair of attachment straps 44 and 46.

The attachment pads 40 and 42 and the attachment straps 44 and 46 each have hook and loop fasteners so that when the flexible cover 30 is brought in place around the barrel 20, the flexible cover will be held in place around the barrel 20. No fasteners or other attachments are necessary to secure the cover to the barrel.

Thereafter, in order to remove the cover 30, the attachment straps 44 and 46 may be separated from the attachment pads 40 and 42.

FIG. 3 illustrates a sectional view taken along section line 3-3 of FIG. 2. Each cover 30, 32, 34 and 36 may be fabricated from a single monolithic material. Alternatively, in a preferred embodiment, each cover includes a pair of opposing external flexible sheets 50 and 52 with insulation 54 therebetween. The insulation 54 may be a variety of materials including ceramic, fiber-glass mat or Nomex felt. The opposed external sheets 50 and 52 may be secured together at the edges to retain the insulation 54 therein.

Each flexible cover has a temperature sensing element thereon. As seen in FIG. 1, covers 30 and 32 include a temperature sensing element in the form of a thermometer 60. Covers 34 and 36 include a temperature sensing element in the form of a thermal chemical sensor 62 which changes colors depending on a change in temperature. For example, the thermal chemical sensor 62 may normally be a green color unless a certain selected temperature is reached, in which case the sensor turns to another color, such as red.

The thermometer 60 may be secured to the external sheet 50 of the cover or may be retained in a recess 64 in the flexible cover 30.

The thermometer 60 may also have a transmitter therewith in order to transmit the temperature sensed to a receiver. Alternatively, or in addition thereto, the temperature sensing element may be connected to an alarm to activate a sound or other signal if the temperature exceeds a certain set temperature point.

Accordingly, the temperature on the outside of the cover 30 is monitored, which also provides an indirect indication of the temperature of the materials in the barrel 20. If an excess temperature is detected by the temperature sensing element, corrective action can be taken. Likewise, if a temperature below a desired range is detected, corrective action can be taken.

Returning to a consideration of FIG. 1, use of a plurality of flexible covers 30, 32, 34 and 36 with a plurality of temperature sensing elements, permits detection of the axial position on the barrel of an unacceptable temperature deviation.

The present invention not only assists in maintaining the heat characteristics of the barrel and the materials therein, but prevents accidental burn injury to personnel coming into contact with the barrel 20.

Whereas, the present invention has been described in relation to the drawings attached hereto, it should be understood that other and further modifications, apart from those shown or suggested herein, may be made within the spirit and scope of this invention.

What is claimed is:

1. An apparatus for thermally insulating a cylindrical barrel having flowable materials therethrough and for monitoring the temperature thereof, said apparatus comprising:
   a plurality of removable flexible covers, each of said plurality of removable flexible covers circumnavigating said cylindrical barrel, each of said plurality of removable flexible covers aligned with each other and axially aligned with said barrel;
   each of said removable flexible covers having a temperature sensing element thereon sensing temperature on an outside of each said cover; and
   each of said removable flexible covers having insulation between a pair of opposing external flexible sheets for thermally insulating, said cylindrical barrel to retain the heat characteristics inside the barrel, said pair of opposing external flexible sheets secured together at the edges thereof.

2. An apparatus as set forth in claim 1 wherein said removable flexible covers have attachment straps and attachment pads.

3. An apparatus as set forth in claim 2 wherein said attachment straps and said attachment pads include hook and loop fasteners.

4. An apparatus as set forth in claim 1 wherein said insulation material is chosen from the group consisting of ceramic fiber, glass mat and Nomex felt.

5. An apparatus as set forth in claim 1 wherein each said removable flexible cover has a length of at least as long as the circumference of said barrel.

6. An apparatus as set forth in claim 1 wherein said temperature sensing element is a thermometer.

7. An apparatus as set forth in claim 1 wherein said temperature sensing element is a thermal chemical sensor which changes colors depending on the change in temperature.

8. An apparatus as set forth in claim 6 wherein said thermometer is received in a recess in said flexible cover.

9. An apparatus as set forth in claim 1 wherein said temperature sensing element is connected to an alarm to activate a signal if temperature exceeds a certain set temperature set point.

* * * * *